F. LAUTENBACHER.
CATENARY SUSPENSION OF THE TROLLEY WIRE FOR ELECTRIC RAILWAYS.
APPLICATION FILED OCT. 17, 1914.
1,157,702.
Patented Oct. 26, 1915.
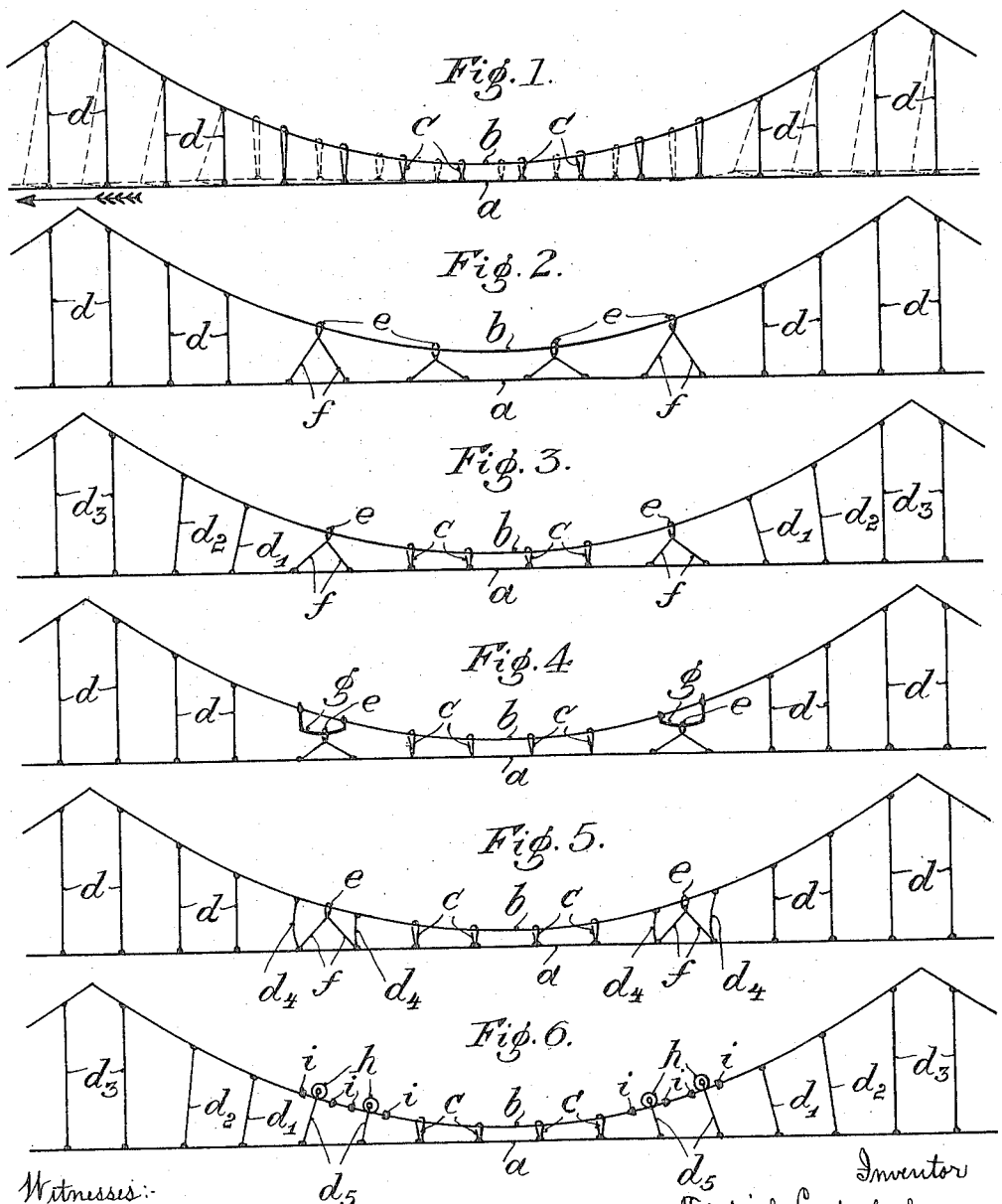

UNITED STATES PATENT OFFICE.

FRIEDRICH LAUTENBACHER, OF MUNICH, GERMANY.

CATENARY SUSPENSION OF THE TROLLEY-WIRE FOR ELECTRIC RAILWAYS.

1,157,702.  Specification of Letters Patent.  Patented Oct. 26, 1915.

Application filed October 17, 1914. Serial No. 867,096.

*To all whom it may concern:*

Be it known that I, FRIEDRICH LAUTENBACHER, a citizen of Germany, residing at Munich, Bavaria, Germany, have invented certain new and useful Improvements in Catenary Suspension of the Trolley-Wire for Electric Railways; and I do hereby declare the following to be a full, clear, and exact description of the invention, such as will enable others skilled in the art to which it appertains to make and use the same.

My invention relates to a catenary suspension system for the trolley wires of electric railways.

The invention includes the use of the usual slack messenger cable and tensioned trolley wire, and relates particularly to the means for suspending the trolley wire from the messenger cable.

Several forms of the invention are illustratively exemplified in the accompanying drawing, wherein—

Figure 1 is an elevational view of a simple form of suspension system embodying my invention; Fig. 2 is a similar view in which the use of eye hangers having divergent arms is illustrated; Fig. 3 is a similar view of a modified form of the invention showing the employment of a combination of loop hangers, eye hangers, and straight and inclined "drops" in proximity to the supporting points of the messenger cable; Fig. 4 is a similar view of a further modified form of the invention wherein loop hangers and yoke hangers are employed; Fig. 5 is a similar view of a further modified form disclosing the use of loop hangers and eye hangers; and Fig. 6 is a still further modification disclosing the use of loop hangers in combination with drops having rollers movable to a limited extent on the messenger cable.

In the systems now in use, so far as I am aware, it has either been customary to employ a yielding connection of some sort between the slack messenger cable and the tensioned trolley wire, or the hangers or drops have been so movably arranged that when the temperature of the place where the system is installed either rises above or drops below a certain mean or normal, the hangers will be capable of moving freely out of the vertical plane. Neither of these systems has been entirely satisfactory, and the main purpose of the present invention is to obviate the defects inherent in both these systems.

I accomplish the object of my invention by a suitable combination of certain features of the suspension systems heretofore employed, using a slidable connection between the trolley wire and the messenger cable between the points of support for the latter, and a hanger or drop connection between the trolley wire and the messenger cable adjacent the points where the latter is supported.

Referring to Fig. 1 *a* is the trolley wire and *b* the messenger cable which is supported in a manner to form catenary curves as shown. Between the supporting points of the messenger cable *b*, that is intermediate the ends of the span, the trolley wire *a* has formed integrally therewith or firmly secured thereto suspenders *c* having loops which slidably engage the messenger cable *b*. Adjacent the supports for the messenger cable, there are formed integrally with the latter and with the trolley wire *a*, or firmly secured to both thereof, hangers or drops *d* which are normally in a preferably vertical position. When the trolley wire moves in the direction of the arrow, either as a result of tensioning or from other causes, the loop suspenders *c* will slide on the messenger cable *b*, while the drops or hangers *d* will assume an inclined position, the positions of the several parts after movement of the trolley wire *a* being indicated in dotted lines.

Fig. 2 discloses a slightly modified arrangement wherein the hangers *d* are placed adjacent the suspension points of the messenger cable, while intermediate these hangers *d*, I employ eye hangers comprising the diverging branches or arms *f* integral with or secured to the trolley wire *a*, and the eyes *e* capable of sliding on the messenger cable *b*. Under the old system of suspension these eye hangers were necessarily provided with horizontal gliding yokes, but according to my invention such yokes may be dispensed with, because the angle of inclination of the messenger cable where these eye hangers are employed is small.

Obviously it is possible to employ a combination of eye and loop hangers, and Figs. 3 to 5 disclose various forms of such combinations.

It occurs at times, although not frequently, that at the points where one form of my improved suspension means merges into another, small differences occur in the plane or horizontal position of the trolley wire, and one feature of my invention has reference to the correction of such irregularities. I accomplish this object in the following manner:—Where a defect of this kind is produced, by tensioning, in the trolley wire in one of the forms of suspension, a similar irregularity is artificially produced in an adjacent part of the wire suspended by different means, and this defect is gradually diminished in degree from one part of the wire to the other, until the defect entirely disappears.

When the trolley wire $a$ is tensioned, the eyes $e$ glide directly on the somewhat inclined portion of the messenger cable $b$ at the part where the two forms of suspension means are juxtaposed, and the trolley wire is therefore either somewhat raised or sags somewhat. To obviate this irregularity I endeavor to correspondingly raise or lower the trolley wire at the adjacent supporting points. In Fig. 3, I have illustrated this effect by providing inclined hangers or drops $d'$ and $d^2$ between the eye supports $e$ and the vertical drops or hangers $d^3$ at the points where the messenger cable $b$ is supported. It will be noted, therefore, that in the normal position the hangers $d'$ and $d^2$ are somewhat inclined, and upon movement of the trolley wire $a$ these hangers $d'$ and $d^2$, will deflect from their normal inclined position. Preferably, the arrangement or position of the hangers $d'$ and $d^2$ (Fig. 2) is such that their inclination constantly decreases toward the vertical hangers $d^3$, that is, the hanger $d'$ is inclined at a greater angle than the hanger $d^2$.

The tendency of the trolley wire $a$ to assume a curved form under the suspension means therefor may be corrected in a manner similar to that above described. Figs. 4 to 6 illustrate means for accomplishing this purpose. In Fig. 4 I have shown the use of intermediate loop suspension means $c$, adjacent eye suspension means $e$ provided with sliding yokes $g$, and ordinary end drops or hangers $d$. By this arrangement the gliding effect is somewhat in the arc of a circle rather than in a rectilinear path, the eyes $e$ describing a circle of a somewhat greater radius than the lower ends of the adjacent drops or hangers $d$. A different way of accomplishing this result, without the use of any special parts such as the yokes $g$, is shown in Fig. 5. In this figure I employ a combination of the eye suspension means $e$ having divergent branches $f$, the hangers or drops $d^4$, and the loops $c$, at the critical suspension point. The length of the drops $d^4$ is such that they are tensioned only in case of substantial deflection in one direction or the other, while in the intermediate or normal position the eyes $e$ support the entire load. Accordingly, the trolley wire will be slightly curved, that is, a curve intermediate the straight sliding or gliding suspension and the circular form of the drop or hanger suspension.

A similar curvature is secured in the trolley wire by the arrangement shown in Fig. 6. The suspension means by which one form of suspension gradually merges into the other, consists of simple vertical suspension wires $d^5$ secured to the trolley wire $a$, but movable on the messenger cable $b$. To this end, each of the wires $d^5$ has one of its ends provided with rollers $h$ which rest upon the messenger cable $b$, the movement of these rollers in either direction being limited by stops $i$ on the messenger cable. The effect of this construction is that the trolley wire does not extend in a true straight line, but is rectilinear at the middle part but slightly curved at the ends, thus describing a somewhat upwardly curved arc.

What I claim as new and desire to secure by Letters Patent is:—

1. In a system of catenary suspension for trolley wires, the combination of a messenger cable supported at intervals, a trolley wire, swinging suspension means for the trolley wire adjacent the supports for the cable, and sliding suspension means for the trolley wire intermediate the supports for the cable.

2. In a system of catenary suspension for trolley wires, the combination of a supported messenger cable, a trolley wire, means secured both to the messenger cable and to the trolley wire, adjacent the cable supports for suspending the wire from the cable, and additional means intermediate said supports and slidable on the messenger cable for suspending the trolley wire from the latter.

3. In a system of catenary suspension for trolley wires, the combination of a messenger cable supported at intermediate points and sagging between said supports, a trolley wire adapted to be suspended from said cable, means secured to the cable and to the wire in proximity to the supports, for suspending the wire from the cable at these points, and means slidable on the sagging portion of the messenger cable and secured to the trolley wire for suspending the latter from the cable at the sagging portion of the latter.

4. In a system of catenary suspension for trolley wires, the combination of a messenger cable suspended at intermediate points and sagging between such supports, a trolley wire adapted to be suspended from said cable, trolley wire suspension means attached to the trolley wire and slidable on the messenger cable at the sagging portion thereof, and inclined hangers attached both to the cable and to the trolley wire in proximity to the supports for the cable.

5. In a system of catenary suspension for trolley wires, the combination of a messenger cable supported at intervals and having sagging portions between the supports, a trolley wire, suspension means for the trolley wire attached to the latter and slidable on the sagging portion of the messenger cable, normally vertical trolley wire suspension means adjacent the supports for the cable attached both to the cable and to the trolley wire, and additional, inclined, suspension means secured both to the cable and to the trolley wire and arranged intermediate the sliding suspension means and the vertical suspension means.

In testimony whereof I hereunto affix my signature in the presence of two witnesses.

FRIEDRICH LAUTENBACHER.

Witnesses:
N. ROEDER,
ARTHUR GUBE.

Copies of this patent may be obtained for five cents each, by addressing the "Commissioner of Patents, Washington, D. C."